United States Patent
Kamiyama et al.

(10) Patent No.: US 12,525,338 B2
(45) Date of Patent: Jan. 13, 2026

(54) INFORMATION PROCESSING SYSTEM, ENDOSCOPE SYSTEM, INFORMATION PROCESSING METHOD, AND ANNOTATION DATA GENERATION METHOD

(71) Applicants: OLYMPUS CORPORATION, Tokyo (JP); National University Corporation OITA UNIVERSITY, Oita (JP); Fukuoka Institute of Technology, Fukuoka (JP)

(72) Inventors: Toshiya Kamiyama, Tama (JP); Makoto Ishikake, Hachioji (JP); Yusaku Fujita, Musashino (JP); Tatsushi Tokuyasu, Fukuoka (JP); Yusuke Matsunobu, Fukuoka (JP); Masafumi Inomata, Oita (JP); Tsuyoshi Etoh, Oita (JP); Yuichi Endo, Oita (JP); Kosuke Suzuki, Oita (JP); Youhei Kouno, Oita (JP); Hiroaki Nakanuma, Oita (JP); Yoshinori Shirasaka, Oita (JP); Atsuro Fujinaga, Oita (JP)

(73) Assignees: OLYMPUS CORPORATION, Tokyo (JP); National University Corporation OITA UNIVERSITY, Oita (JP); Fukuoka Institute of Technology, Fukuoka (JP)

( * ) Notice: Subject to any disclaimer, the term of this patent is extended or adjusted under 35 U.S.C. 154(b) by 302 days.

(21) Appl. No.: 18/226,368

(22) Filed: Jul. 26, 2023

(65) Prior Publication Data
US 2024/0274272 A1     Aug. 15, 2024

Related U.S. Application Data

(63) Continuation of application No. PCT/JP2021/002754, filed on Jan. 27, 2021.

(51) Int. Cl.
*G06T 7/50* (2017.01)
*G06T 7/11* (2017.01)
(Continued)

(52) U.S. Cl.
CPC .............. *G16H 30/40* (2018.01); *G06T 7/11* (2017.01); *G06T 7/50* (2017.01); *G06T 7/70* (2017.01);
(Continued)

(58) Field of Classification Search
CPC .. G16H 30/40; G06T 7/11; G06T 7/50; G06T 7/70; G06T 2207/10068; G06T 7/00;
(Continued)

(56) References Cited

U.S. PATENT DOCUMENTS

| 10,937,169 B2 * | 3/2021 | Dharur ...................... G06T 7/11 |
| 2012/0140989 A1 * | 6/2012 | Hori ........................ G06T 7/136 382/106 |

(Continued)

FOREIGN PATENT DOCUMENTS

| CN | 111612002 A | 9/2020 |
| JP | H05-216993 A | 8/1993 |

(Continued)

OTHER PUBLICATIONS

International Search Report dated Mar. 16, 2021 received in PCT/JP2021/002754.
(Continued)

*Primary Examiner* — Bobbak Safaipour
(74) *Attorney, Agent, or Firm* — Scully, Scott, Murphy & Presser & P.C.

(57) ABSTRACT

An information processing system includes a processor that performs an object detection to detect an object from a detection target image. The processor divides the detection target image into a group of first grid cells. The object is
(Continued)

positioned to overlap a group of second grid cells included in the group of the first grid cells. At this time, the processor generates a bounding box in a respective second grid cell included in the group of the second grid cells. The processor surrounds a portion of the object positioned in the respective second grid cell with the bounding box generated in the respective second grid cell and displays, on a display, a position and shape of the object by a collection of a plurality of bounding boxes superimposedly on the detection target image.

20 Claims, 10 Drawing Sheets

(51) Int. Cl.
*G06T 7/70* (2017.01)
*G06V 10/25* (2022.01)
*G16H 30/40* (2018.01)
*H04N 5/265* (2006.01)

(52) U.S. Cl.
CPC ............ *G06V 10/25* (2022.01); *H04N 5/265* (2013.01); *G06T 2207/10068* (2013.01); *G06V 2201/07* (2022.01)

(58) Field of Classification Search
CPC .... G06V 10/25; G06V 2201/07; H04N 5/265; A61B 1/045
See application file for complete search history.

(56) References Cited

U.S. PATENT DOCUMENTS

| | | |
|---|---|---|
| 2019/0208979 A1 | 7/2019 | Bassa et al. |
| 2020/0193609 A1 | 6/2020 | Dharur et al. |
| 2022/0180122 A1* | 6/2022 | Kondo ...................... G06T 7/90 |
| 2022/0207305 A1* | 6/2022 | Mosayyebpour Kaskari ............. G06F 18/217 |

FOREIGN PATENT DOCUMENTS

| | | |
|---|---|---|
| JP | 2005-056346 A | 3/2005 |
| JP | 2019-211403 A | 12/2019 |
| WO | 2019/155628 A1 | 8/2019 |

OTHER PUBLICATIONS

"Object detection using YOLO", <URL:https://www.renom.jp/ja/notebooks/tutorial/image_processing/yolo/notebook.html.

"U-Net: Semantic segmentation method based on deep learning", <URL:https://blog.negativemind.com/2019/03/15/semantic-segmentation-by-u-net/>.

[Updated] BodyPix: Real-time Person Segmentation in the Browser with TensorFlow.js, <URL:https://blog.tensorflow.org/2019/11/updated-bodypix-2.html>.

* cited by examiner

INFORMATION PROCESSING SYSTEM, ENDOSCOPE SYSTEM, INFORMATION PROCESSING METHOD, AND ANNOTATION DATA GENERATION METHOD

CROSS REFERENCE TO RELATED APPLICATIONS

This application is a continuation of International Patent Application No. PCT/JP2021/002754, having an international filing date of Jan. 27, 2021, which designated the United States, the entirety of which is incorporated herein by reference.

BACKGROUND OF THE INVENTION

"Object detection using YOLO", [online], [searched on Sep. 9, 2020], on the Internet <URL:https://www.renom.jp/ja/notebooks/tutorial/image_processing/yolo/notebook.html>, discloses You Only Look Once (YOLO) as an object detection method using machine learning. The YOLO is a method of detecting a specific object for which a model has been preliminarily trained, and outputting a bounding box that surrounds the detected object. This bounding box is superimposed on an image, whereby the bounding box that surrounds the detected object is displayed.

"U-Net: Semantic segmentation method based on deep learning", [online], [searched on Sep. 9, 2020], on the Internet <URL:https://blog.negativemind.com/2019/03/15/semantic-segmentation-by-u-net/>, discloses U-Net as a semantic segmentation method using machine learning. Semantic segmentation is a method of dividing an image into regions belonging to respective categories. In the U-Net, each pixel of an image is classified into a category. A pixel classified into a category indicating a specific object is displayed in a specific color, whereby a region in which the specific object is present in the image is displayed to be filled with a specific color.

"[Updated] Body Pix: Real-time Person Segmentation in the Browser with TensorFlow.js" [online], on Nov. 18, 2019, [searched on Sep. 9, 2020], on the Internet <URL:https://blog.tensorflow.org/2019/11/updated-bodypix-2.html>, discloses BodyPix as a method of adding an attribute to an image using machine learning. In the Body Pix, an image is divided into grid cells, and an attribute is added to each grid cell. For example, in the BodyPix, determined are whether each grid cell belongs to a human or the background, and to which portion a grid cell belonging to the human belongs, such as a face and an arm. The grid cells are displayed in different colors or the like depending on respective attributes, whereby portions of the human body and the background are displayed in a grid.

SUMMARY OF THE INVENTION

In accordance with one of some aspect, there is provided an information processing system comprising:
a processor configured to perform an object detection to detect an object from a detection target image, the processor being configured to:
divide the detection target image into a group of first grid cells;
when the object is positioned to overlap a group of second grid cells included in the group of the first grid cells, generate a bounding box in a respective second grid cell in the group of the second grid cells; and
surround a portion of the object positioned in the respective second grid cell with the bounding box generated in the respective second grid cell and display, on a display, a position and shape of the object by a collection of a plurality of bounding boxes superimposedly on the detection target image.

In accordance with one of some aspect, there is provided an endoscope system comprising:
the above information processing system; and
an image sensor that captures the detection target image.

In accordance with one of some aspect, there is provided an information processing method for an object detection to detect an object from a detection target image, the method comprising:
dividing the detection target image into a group of first grid cells;
generating, when the object is positioned to overlap a group of second grid cells included in the group of the first grid cells, a bounding box in a respective second grid cell in the group of the second grid cells; and
surrounding a portion of the object positioned in the respective second grid cell with the bounding box generated in the respective second grid cell and displaying, on a display, a position and shape of the object by a collection of a plurality of bounding boxes superimposedly on the detection target image.

In accordance with one of some aspect, there is provided an annotation data generation method, the method comprising:
inputting mask data indicating a position and shape of an object in a training image;
dividing the mask data into a group of grid cells;
generating, when a plurality of grid cells included in the group of grid cells overlaps with the object, a bounding box in each of the plurality of grid cells; and
using a collection of a plurality of the generated bounding boxes as an annotation for the object.

DETAILED DESCRIPTION

Figure 1:
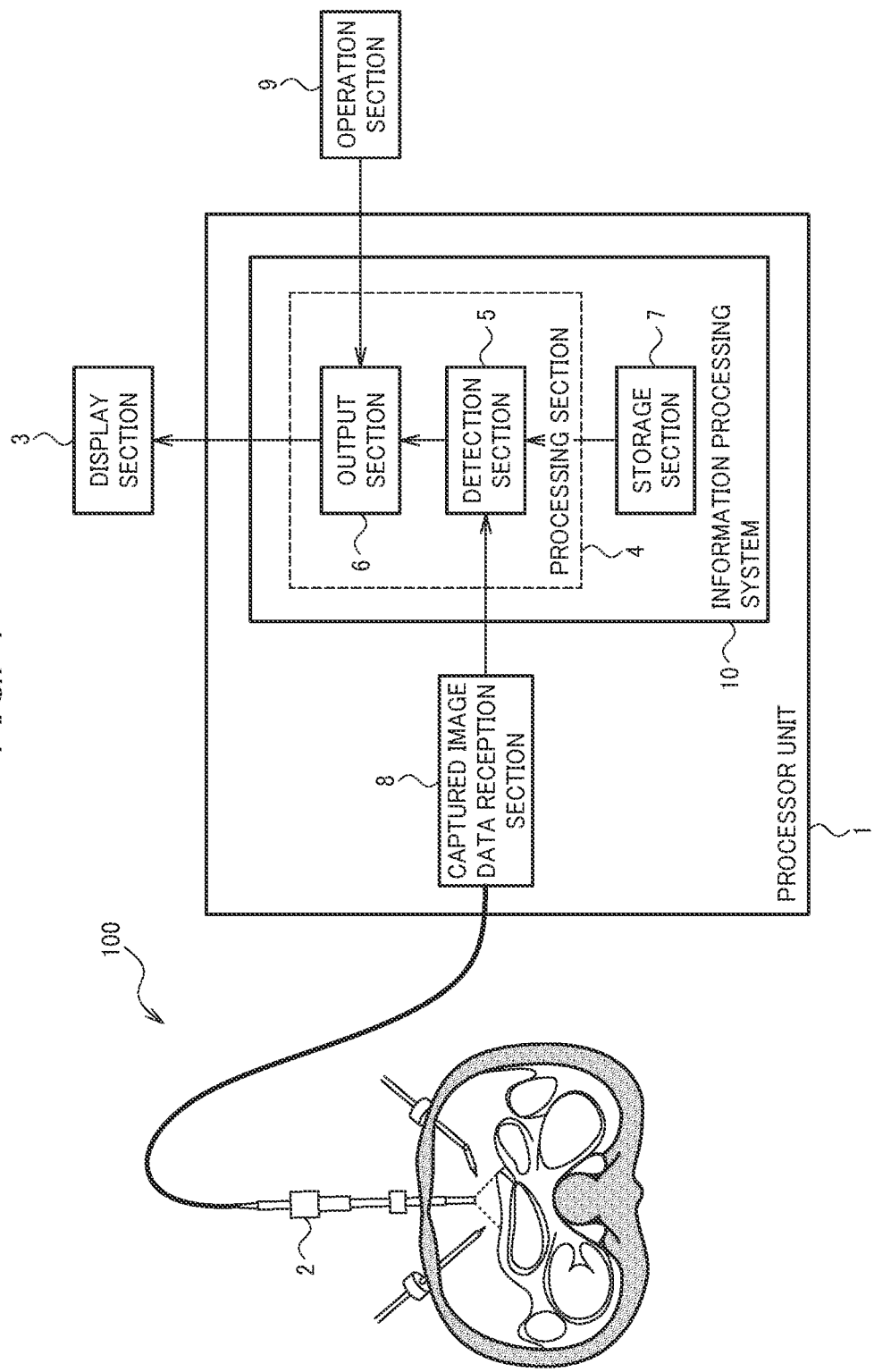
FIG. 1 illustrates a configuration example of an information processing system and that of an endoscope system.

The following disclosure provides many different embodiments, or examples, for implementing different features of the provided subject matter. These are, of course, merely examples and are not intended to be limiting. In addition, the disclosure may repeat reference numerals and/or letters in the various examples. This repetition is for the purpose of simplicity and clarity and does not in itself dictate a relationship between the various embodiments and/or configurations discussed. Further, when a first element is described as being "connected" or "coupled" to a second element, such description includes embodiments in which the first and second elements are directly connected or coupled to each other, and also includes embodiments in which the first and second elements are indirectly connected or coupled to each other with one or more other intervening elements in between.

1. Information Processing System and Endoscope System

FIG. 1 illustrates a configuration example of an information processing system 10 in accordance with the present embodiment and that of an endoscope system 100 including the information processing system 10. The endoscope system 100 includes a processor unit 1, an endoscopic scope 2, and a display section 3. The endoscope system 100 may further include an operation section 9.

An imaging device is arranged at a leading end portion of the endoscopic scope 2, and the leading end portion is inserted into an abdominal cavity. The imaging device includes an objective optical system that forms an image of a subject, and an image sensor that captures the image. The imaging device captures an image of the inside of the abdominal cavity, and captured image data is transmitted from the endoscopic scope 2 to the processor unit 1.

The processor unit 1 is a device that performs various kinds of processing in the endoscope system 100. For example, the processor unit 1 performs control of the endoscope system 100, image processing, and the like. The processor unit 1 includes a captured image data reception section 8 that receives captured image data from the endoscopic scope 2, and the information processing system 10 that detects an object from the captured image data based on a trained model.

The captured image data reception section 8 is, for example, a connector to which a cable of the endoscopic scope 2 is connected, an interface circuit that receives the captured image data, and the like.

The information processing system 10 includes a storage section 7 that stores the trained model, and a processing section 4 that detects the object from an image based on the trained model stored in the storage section 7.

The storage section 7 is, for example, a storage device such as a semiconductor memory, a hard disk drive, and an optical disk drive. The trained model is preliminarily stored in the storage section 7. Alternatively, the trained model is input to the information processing system 10 from an external device such as a server via a network, and may be stored in the storage section 7.

The processing section 4 includes a detection section 5 and an output section 6. The detection section 5 detects the object from an image by inference based on the trained model. The output section 6 causes the display section 3 to display an image by superimposing information indicating the object on the image based on a result of the detection. As an object detection algorithm, various algorithms called detection such as You Only Look Once (YOLO) and Single Shot Multibox Detector (SSD) are adopted. However, the present embodiment is different from the related art in generation of a candidate box, generation and display of a bounding box, training data at the time of training, and the like. Details of the difference will be described later.

As hardware that executes inference based on the trained model, various kinds of hardware can be assumed. The detection section 5 is, for example, a general purpose processor such as a central processing unit (CPU), a microprocessing unit (MPU), a graphics processing unit (GPU), and a digital signal processor (DSP). In this case, the storage section 7 stores, as the trained model, a program in which an inference algorithm is described and a parameter used for the inference algorithm. Alternatively, the detection section 5 may be a dedicated processor that implements the inference algorithm as hardware, such as an application-specific integrated circuit (ASIC) and a field-programmable gate array (FPGA) circuit. In this case, the storage section 7 stores a parameter used for the inference algorithm as the trained model. A neural network can be applied as the inference algorithm. In this case, a weight coefficient assigned between connected nodes in the neural network is a parameter.

The display section 3 is a monitor that displays an image output from the output section 6, and is, for example, a display device such as a liquid crystal display and an organic electroluminescence (EL) display.

The operation section 9 is a device for an operator to operate the endoscope system 100. The operation section 9 is, for example, a button, a dial, a foot switch, a touch panel, or the like. As described later, the output section 6 may change a display mode of the object based on input information from the operation section 9.

While the information processing system 10 is included in the processor unit 1 in the above description, part or the whole of the information processing system 10 may be arranged outside the processor unit 1. For example, the storage section 7 and the detection section 5 may be implemented by an external processing device such as a personal computer (PC) and a server. In this case, the captured image data reception section 8 transmits captured image data to the external processing device via a network or the like. The external processing device transmits information indicating a detected object to the output section 6 via the network or the like. The output section 6 causes the display section 3 to display the image by superimposing the received information on the image.

Figure 2:
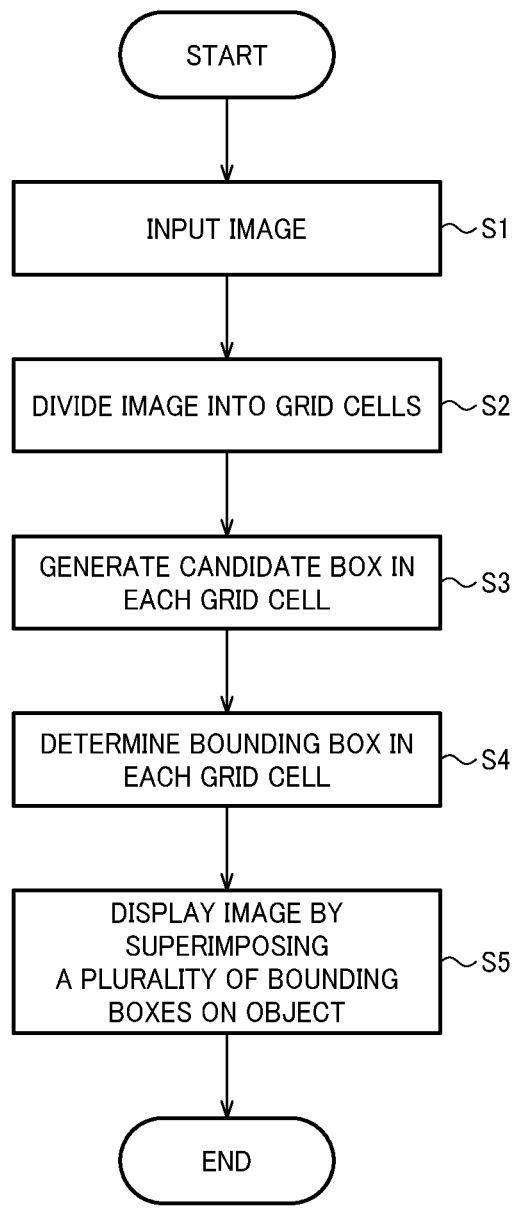
FIG. 2 is a flowchart describing processing performed by a processing section.
Figure 3:
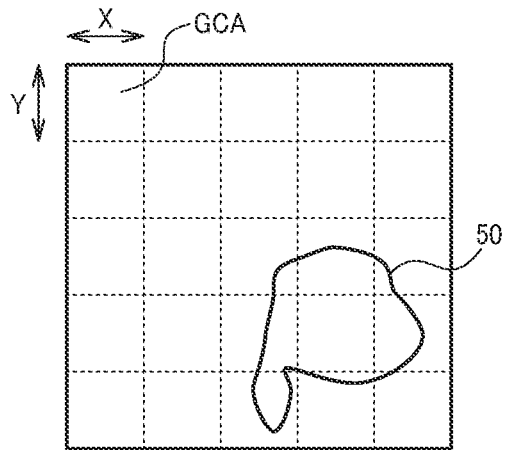
FIG. 3 is a diagram for describing processing performed by the processing section.

FIG. 2 is a flowchart describing processing performed by the processing section 4. In addition, FIGS. 3 to 5 are diagrams for describing processing performed by the processing section 4.

As illustrated in FIG. 2, an image is input to the detection section 5 in step S1. Specifically, the endoscopic scope 2 captures a video of the inside of the abdominal cavity, and frame images of the captured video are input to the detection section 5 in real time. Steps S1 to S5 described in FIG. 2 are performed on each frame image.

In step S2, the detection section 5 divides the image into grid cells GCA. As illustrated in FIG. 3, the image is divided by grids with an interval X in a horizontal direction and an interval Y in a vertical direction, and individual regions after the division serve as the respective grid cells GCA. One grid cell GCA has a horizontal side length X and a vertical side length Y. The horizontal direction corresponds to a horizontal scanning direction of the image and the vertical direction corresponds to a vertical scanning direction of the image. The lengths X and Y are represented by, for example, the number of pixels. A plurality of grid cells GCA obtained by division of the whole image is also referred to as a group of first grid cells, and each cell of the group is also referred to as a first grid cell.

Figure 4:
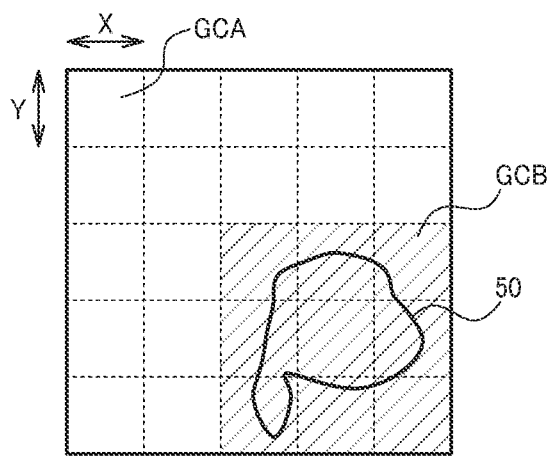
FIG. 4 is a diagram for describing processing performed by the processing section.
Figure 5:
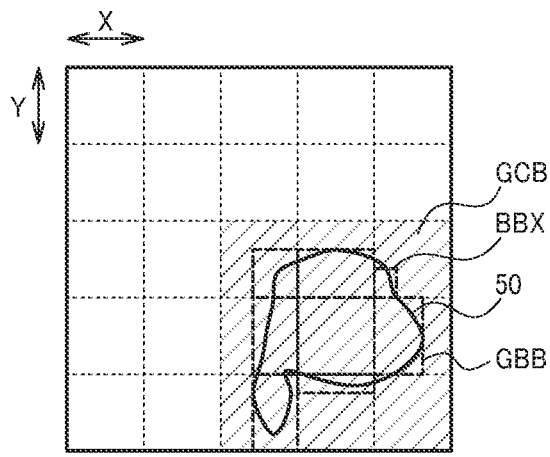
FIG. 5 is a diagram for describing processing performed by the processing section.

As illustrated in FIG. 4, assume that an object 50 is seen in part of the image. The object 50 is an object serving as a detection target of the detection section 5. Note that FIG. 4 illustrates an example in which the object 50 is directly seen in the image, but the object 50 may be such an object as that is not directly seen in the image but included within an imaging angle of view, as described later. In FIG. 4, a plurality of grid cells GCB included in the above-mentioned group of first grid cells overlaps with the object 50. Such a plurality of grid cells GCB overlapping with the object 50 is also referred to as a group of second grid cells, and each cell of the group is also referred to as a second grid cell. In FIG. 4, the group of the second grid cells is hatched. The group of the second grid cells is included in the group of the first grid cells, and each grid cell itself is identical. That is, the grid cell GCB also has the horizontal side length X and the vertical side length Y.

As described in step S3 in FIG. 2, the detection section 5 generates a candidate box in each grid cell. At this time, the detection section 5 generates the candidate box in each grid cell GCB overlapping with the object 50. The detection section 5 generates a plurality of candidate boxes with respect to one grid cell GCB. Each candidate box is generated so as to fall within the grid cell GCB, that is, so as not to overlap with an adjacent grid cell. Note that the candidate box is not limited thereto. Details of the candidate box will be described later.

In step S4, the detection section 5 determines a bounding box in each grid cell. The detection section 5 generates a plurality of candidate boxes for the bounding box, calculates a reliability score with respect to each of the plurality of candidate boxes, and determines the bounding box among the plurality of candidate boxes based on the reliability score. Specifically, the detection section 5 determines a candidate box having the highest reliability score as the bounding box. As illustrated in FIG. 5, a bounding box BBX is generated with respect to each of the grid cells GCB overlapping with the object 50. That is, while one bounding box is generated with respect to one object 50 in an object detection in the related art, a plurality of bounding boxes BBX is generated with respect to one object 50, and the object 50 is covered with a collection of the plurality of bounding boxes BBX in the present embodiment.

Note that the bounding box BBX mentioned herein is a rectangle that includes part of the object 50 overlapping with the grid cell GCB. The reliability score is a score indicating a likelihood of the candidate box as the bounding box BBX. That is, the reliability score becomes higher in a candidate box that appropriately includes the part of the object 50 overlapping with the grid cell GCB.

In step S5, the output section 6 superimposes the determined bounding box BBX in the grid cell GCB on the image, and outputs the image after the superposition to the display section 3. The output section 6 may superimpose only a frame of the bounding box BBX on the image, or may superimpose a rectangle in which the inside of the bounding box BBX is filled with a color on the image. Alternatively, the output section 6 may a-blend the bounding box BBX and the image to superimpose the bounding box BBX on the image. Since the plurality of bounding boxes BBX is generated with respect to one object 50 as described above, display is performed so that the object 50 is covered with the collection of the plurality of bounding boxes BBX.

As described above, the information processing system 10 in accordance with the present embodiment includes the processing section 4 that performs an object detection to detect the object from a detection target image. The detection section 5 of the processing section 4 divides the detection target image into the group of the first grid cells. When the object 50 is positioned so as to overlap with the group of the second grid cells included in the group of the first grid cells, the detection section 5 generates the bounding box BBX in a respective second grid cell GCB included in the group of the second grid cells. The output section 6 of the processing section 4 surrounds the part of the object 50 positioned in the respective second grid cell GCB with the bounding box BBX generated in the second grid cell GCB, and causes the display section 3 to display the position and shape of the object 50 by superimposing the collection of the plurality of bounding boxes BBX on the detection target image.

The detection target image mentioned herein is an image input to the processing section 4 as a target of the object detection, and is an in-vivo image captured by the endoscopic scope 2. In FIG. 1, an image input from the endoscopic scope 2 to the processing section 4 via the captured image data reception section 8 is the detection target image. Alternatively, an image captured by the endoscopic scope 2 is recorded in the storage section 7 or the like, and may be input to the processing section 4 when the recorded image is reproduced. In this case, the image input from the storage section 7 to the processing section 4 is the detection target image.

The present embodiment employs the object detection method in which the bounding box is generated with respect to the detected object, and thus enables high-speed processing and can maintain a real-time characteristic in a movie. In addition, the position and shape of the object 50 are displayed as the collection of the plurality of bounding boxes BBX, and thus can be represented in a more detailed manner than those represented in a case of the object detection in the related art in which the object 50 is surrounded with one bounding box, or the Body Pix in which grid cells are color-coded. In this manner, the present embodiment can simultaneously achieve the real-time characteristic and the display of the position and shape.

The above-mentioned YOLO enables extremely high-speed detection, and thereby enables display of a detection result that maintains the real-time characteristic in a movie or the like. Meanwhile, in the YOLO, since one object of interest is merely surrounded with one rectangular bounding box, a contour shape of the object of interest cannot be determined. In the U-Net, since the object of interest is determined on a pixel-by-pixel basis and the image is color-coded, the contour shape of the object of interest can be represented. Meanwhile, since the U-Net requires long calculation time, the real-time characteristic cannot be maintained in a movie or the like. In the Body Pix, determined is an attribute of a grid cell that is coarser than a pixel. Thus, the Body Pix enables a higher-speed operation than that by semantic segmentation such as the U-Net. Meanwhile, since the object of interest is represented by a collection of coarse grid cells, the contour shape of the object of interest cannot be represented in a detailed manner.

As described above, the techniques in the related art have an issue that it is impossible to simultaneously achieve, in display of the object of interest using machine learning, the maintaining of the real-time characteristic and the display of the contour shape of the object of interest. The present embodiment can simultaneously achieve the real-time characteristic and the display of the position and shape as described above.

Figure 6:
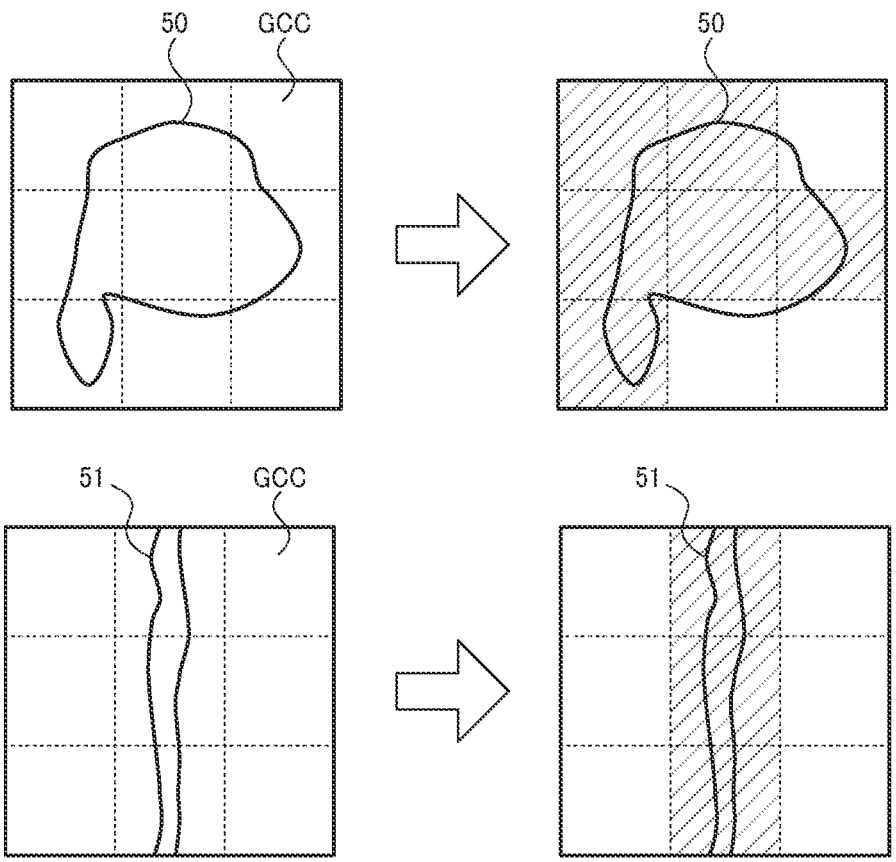
FIG. 6 illustrates a display example in a case where BodyPix is used.

FIG. 6 illustrates a display example in a case where the Body Pix is used. As illustrated in an upper stage of FIG. 6, an image including the object 50 is divided into a plurality of grid cells GCC, and grid cells GCC determined to include the object 50 among the plurality of grid cells GCC are colored and displayed. In FIG. 6, the grid cells GCC determined to include the object 50 are hatched.

In the BodyPix, since coloring is performed on a grid cell GCC-by-grid cell GCC basis, the position and shape of the object 50 cannot be represented in a more detailed manner than the grid cell GCC. In accordance with the present embodiment, since the processing section 4 is capable of generating the bounding box BBX that is smaller than the grid cell GCB as described with reference to FIG. 5, the position and shape of the object 50, even if the object 50 has such a complex shape as that includes a curved portion, can be represented in a detailed manner.

Figure 7:
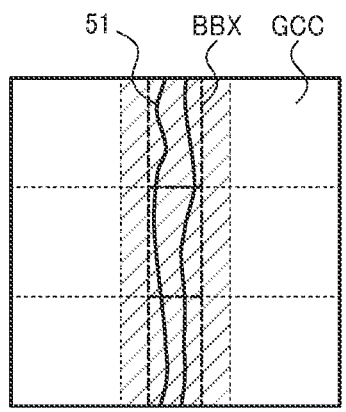
FIG. 7 illustrates a display example in a case where an object detection in accordance with the present embodiment is used.

In a case where the BodyPix is applied to an object 51 having a thin and long shape, such as a blood vessel, the bile duct, the urinary duct, and nerves as illustrated in a lower stage of FIG. 6, the thin and long shape can be merely represented by a width of the grid cell GCC. The position of the object 51 is fluctuated by a pulsation of the living body, an operation of the endoscopic scope 2, or the like. However, since a fluctuation that is smaller than the width of the grid cell GCC is not reflected on display, the position of the object 51 is not displayed appropriately. In accordance with the present embodiment, since the processing section 4 is capable of generating the bounding box BBX that is thinner than the grid cell GCB as illustrated in FIG. 7, the long and thin shape of the object 50 can be represented. Even in a case where the position of the object 51 is fluctuated, the bounding box BBX having a width that is smaller than that of the grid cell GCB enables grasping of the fluctuation in position of the object 50 in a detailed manner.

Note that the output section 6 may superimpose the bounding box BBX on the detection target image with opacity depending on a reliability score. In the a-blending, when a blend ratio of the bounding box BBX is a and a blend ratio of the detection target image is 1−α, α corresponds to the opacity. The output section 6 increases the opacity of the bounding box BBX as the reliability score of the bounding box BBX becomes higher.

With this processing, the position and shape of the object 50 can be represented in a more detailed manner. For example, it is assumed that the reliability sore of the bounding box BBX decreases in a contour of the object 50. In this case, the bounding box BBX arranged in the contour of the object 50 has lower opacity than the bounding box BBX arranged inside the object 50, and is displayed in a lighter color. Accordingly, the shape of the object 50 is displayed so as to appear to be more similar to the actual shape.

2. Regarding Bounding Box and Candidate Box

Figure 8:
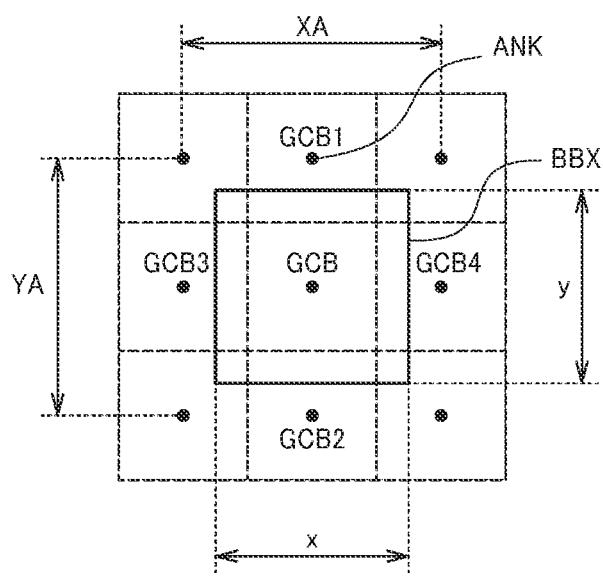
FIG. 8 illustrates a first example of a bounding box BBX.

FIG. 8 illustrates a first example of the bounding box BBX.

Assume that a first one GCB1 of the second grid cells and a second one GCB2 of the second grid cells are adjacent to the second grid cell GCB in the horizontal direction, and a third one GCB3 of the second grid cells and a fourth one GCB4 of the second grid cells are adjacent to the second grid cell GCB in the vertical direction. In addition, assume that a length between an anchor ANK of the first one GCB1 of the second grid cells and an anchor ANK of the second one GCB2 of the second grid cells is XA, and a length between an anchor ANK of the third one GCB3 of the second grid cells and an anchor ANK of the fourth one GCB4 of the second grid cells is YA. At this time, the detection section 5 generate a bounding box BBX having a horizontal side length x that is smaller than the XA, having a vertical side length y that is smaller than the YA, and not including the anchors ANK of the first one GCB1 of the second grid cells to the fourth one GCB4 of the second grid cells.

The anchor ANK is a representative point when the detection section 5 generates a candidate box, and is, for example, a center point of each grid cell. That is, the detection section 5 generates the candidate box using the anchor ANK of the second grid cell GCB as a reference. The center of the candidate box and the anchor ANK may not be matched with each other. The lengths x, y, XA, and YA are represented by, for example, the number of pixels. "The bounding box BBX not including the anchors ANK of the first one GCB1 of the second grid cells to the fourth one GCB4 of the second grid cells" means that the anchors ANK of the grid cells GCB1 to GCB4 do not exist within a rectangular region surrounded with the bounding box BBX.

In accordance with the present embodiment, a size x×y of the bounding box BBX is restricted by XA×YA. That is, the size x×y of the bounding box BBX is restricted by a distance between anchors of adjacent grid cells. The position of the bounding box BBX is restricted so as not to transcend the anchors of adjacent grid cells. With this configuration, a plurality of bounding boxes BBX is generated with respect to one object that is larger than the grid cell, and the object 50 is represented by a collection of the plurality of bounding boxes BBX.

Figure 9:
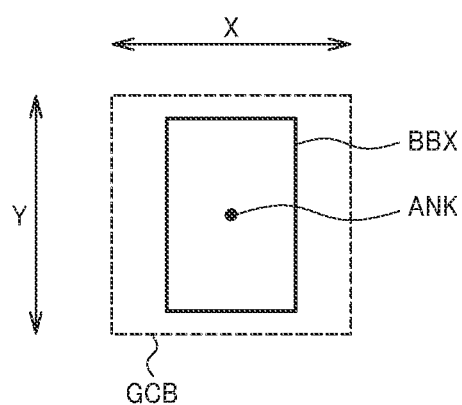
FIG. 9 illustrates a second example of the bounding box BBX.

FIG. 9 illustrates a second example of the bounding box BBX.

Assume that the second grid cell GCB has a horizontal side length X and a vertical side length Y. At this time, a horizontal side length x of the bounding box BBX is smaller than or equal to the X. and a vertical side length y of the bounding box BBX is smaller than or equal to the Y.

In accordance with the present embodiment, since the bounding box BBX that is smaller than the grid cell GCB can be generated, the position and shape of the object 50 can be represented by the bounding box BBX that is smaller than the grid cell GCB in detailed manner.

Note that the detection section 5 may generate the bounding box BBX that satisfies at least one of x≤X or y≤Y. That is, the horizontal side length x of the bounding box BBX may be smaller than or equal to the X, and the vertical side length y of the bounding box BBX may be smaller than the YA in FIG. 8. Alternatively, the horizontal side length x of the bounding box BBX may be smaller than the XA in FIG. 8, and the vertical side length y of the bounding box BBX may be smaller than or equal to the Y.

A description is now given of the candidate box to determine the bounding box BBX like the one illustrated in FIG. 8 or FIG. 9 described above.

The detection section 5 determines the bounding box BBX among a plurality of candidate boxes. At this time, the plurality of candidate boxes includes a candidate box that satisfies at least one of a condition that the horizontal side length x of the candidate box is smaller than the X or a condition that the vertical side length y of the candidate box is smaller than Y. As described with reference to FIG. 9, the X represents the horizontal side length of the grid cell GCB, and the Y represents the vertical side length of the grid cell GCB. Note that not all of the plurality of candidate boxes need not satisfy the above-mentioned condition, and part of the plurality of candidate boxes is only required to satisfy the above-mentioned condition.

This configuration allows the detection section 5 to determine, as the bounding box BBX, the candidate box that satisfies at least one of the condition that the horizontal side length x of the candidate box is smaller than the X or the condition that the vertical side length y of the candidate box is smaller than the Y. The selection of such a bounding box BBX enables representation of the position and shape in a more detailed manner than those of the grid cell GCB.

In addition, the detection section 5 may generate a plurality of candidate boxes like the following. Assume that each candidate box has a horizontal side length xc and a vertical side length yc. At this time, the xc is smaller than the XA in FIG. 8, the yc is smaller than the YA in FIG. 8, and each candidate box does not include the anchors ANK of the first one GCB1 of the second grid cells to the fourth one GCB4 of the second grid cells.

With this configuration, the detection section 5 determines the bounding box BBX among the above-mentioned plurality of candidate boxes, and can thereby generate the bounding box BBX that satisfies the condition described with reference to FIG. 8. That is, the bounding box BBX has the horizontal side length x that is smaller than the XA, has the vertical side length y that is smaller than the YA, and does not include the anchors ANK of the first one GCB1 of the second grid cells to the fourth one GCB4 of the second grid cells.

In addition, the detection section 5 may generate a plurality of candidate boxes like the following. The horizontal side length xc of each candidate box is smaller than or equal to the X and the vertical side length yc of each candidate box is smaller than the YA, or the horizontal side length xc of each candidate box is smaller than the XA and the vertical side length yc of each candidate box is smaller than or equal to the Y.

With this configuration, the detection section 5 determines the bounding box BBX among the above-mentioned plurality of candidate boxes, and can thereby generate the bounding box BBX that satisfies the following condition. That is, the horizontal side length x of the bounding box BBX is smaller than or equal to the X and the vertical side length y of the bounding box BBX is smaller than the YA, or the horizontal side length x of the bounding box BBX is smaller than the XA and the vertical side length y of the bounding box BBX is smaller than or equal to the Y.

Alternatively, the detection section 5 may generate a plurality of candidate boxes like the following. The horizontal side length xc of each candidate box is smaller than or equal to the X, and the vertical side length yc of each candidate box is smaller than or equal to the Y.

With this configuration, the detection section 5 determines the bounding box BBX among the above-mentioned plurality of candidate boxes, and can thereby generate the bounding box BBX that satisfies the condition described with reference to FIG. 9. That is, the horizontal side length x of the bounding box BBX is smaller than the X and the vertical side length y of the bounding box BBX is smaller than the Y.

Figure 10:
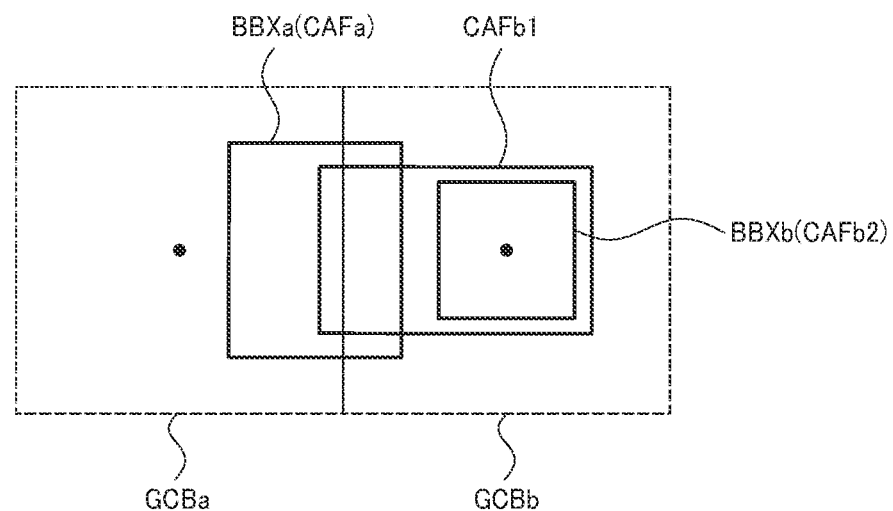
FIG. 10 illustrates a third example of the bounding box BBX.

FIG. 10 illustrates a third example of the bounding box BBX.

Assume that two second grid cells adjacent to each other, among the group of the second grid cells, are second grid cells GCBa and GCBb. A bounding box BBXa generated in one second grid cell GCBa of these second grid cells and a bounding box BBXb generated in the other second grid cell GCBb of these second grid cells do not overlap with each other.

If the bounding boxes are permitted to overlap with each other, there is a possibility for generation of a large bounding box, and there is a possibility for coarse representation of the position and shape of the object 50 due to the bounding box. In accordance with the present embodiment, since the position and shape of the object 50 is represented by the collection of the plurality of bounding boxes that does not overlap with each other, the position and shape of the object 50 can be represented in a detailed manner.

A description is now given of the candidate box to determine the bounding box BBX like the one illustrated in FIG. 10 described above.

The detection section 5 determines, among a plurality of candidate boxes generated in the one second grid cell GCBa of the two adjacent second grid cells GCBa and GCBb and a plurality of candidate boxes generated in the other second grid cell GCBb thereof, a pair of candidate boxes that do not overlap with each other as the bounding box BBXa in the one second grid cell GCBa and the bounding box BBXb in the other second grid cell GCBb.

In FIG. 10, a candidate box CAFa is generated in the second grid cell GCBa, and candidate boxes CAFb1 and CAFb2 are generated in the second grid cell GCBb. Note that a plurality of candidate boxes is generated in the second grid cell GCBa in actuality. In the example in FIG. 10, the candidate boxes CAFa and CAFb1 overlap with each other. The detection section 5 determines a pair of candidate boxes CAFa and CAFb2 that do not overlap with each other as the bounding boxes BBXa and BBXb, respectively.

With this processing, it is possible to generate bounding boxes like the bounding boxes BBXa and BBXb that are generated in the adjacent two second grid cells GCBa and GCBb, respectively, and that do not overlap with each other.

The horizontal side length xc and vertical side length yc of the candidate box described with reference to FIGS. 8 to 10 are integer multiples of a unit length a. The horizontal side length x and vertical side length y of the bounding box BBX determined by such a candidate box are integer multiples of the unit length a.

When n and m are integers of 1 or more, relations of xc=n×a and yc=m×a hold. The unit length a is preliminarily set as a unit of a side length, and is smaller than each of the side lengths X and Y of a grid cell. More specifically, the unit length a is smaller than each of X/2 and Y/2.

Since the size xc×yc of the candidate box is restricted as described with reference to FIG. 8 or FIG. 9, each of n and m is less than or equal to a finite integer. Accordingly, the number of the plurality of candidate boxes generated by the detection section 5 is limited to a finite number, whereby processing load for the object detection is decreased.

3. Training Processing and Annotation Data Generation Method

Subsequently, training processing that implements the object detection in accordance with the present embodiment is described. The object detection in accordance with the present embodiment can be applied to, for example, cholecystectomy through laparoscopy. The training processing is described below taking the cholecystectomy through laparoscopy for example. However, a target to which the object detection and the training processing in accordance with the present embodiment are applied is not limited to the cholecystectomy through laparoscopy. That is, the present embodiment can be applied to a case where machine learning is performed based on training data in which an annotation is added to an image by an operator and an object is detected from an image based on a trained model that has been trained by the machine learning.

Figure 11:
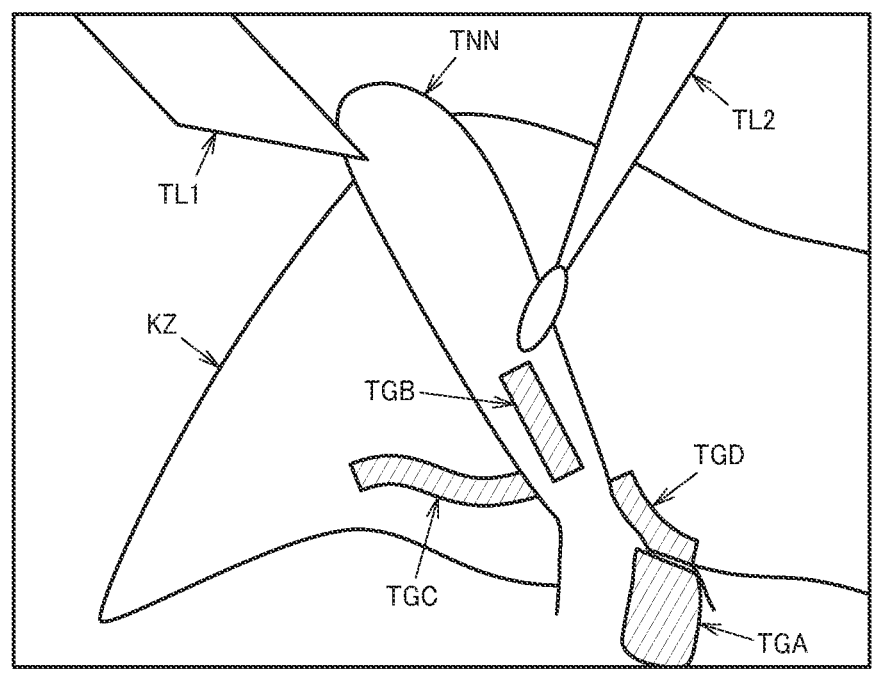
FIG. 11 illustrates an example of a training image and mask data in cholecystectomy through laparoscopy.

FIG. 11 illustrates an example of a training image and mask data in the cholecystectomy through laparoscopy. The training image is an image used for the training processing, and is preliminarily captured using an endoscope system. The training image is, for example, a frame image of a movie captured with the inside of an abdominal cavity.

Images of the liver KZ, the gallbladder TNN, and treatment tools TL1 and TL2 are captured in the training image. As targets of the object detection, the common bile duct, the cystic duct, the Rouviere's sulcus, and the inferior border of the S4 are included within an angle of view of the training image. The operator who performs annotation identifies the common bile duct, the cystic duct, the Rouviere's sulcus, and the inferior border of the S4 from the training image, and adds mask data to each of them. In the training image after the mask data is added, each of mask data TGA indicating the common bile duct, mask data TGB indicating the cystic duct, mask data TGC indicating the Rouviere's sulcus, and mask data TGD indicating the inferior border of the S4 is added. For example, the operator uses a pointing device such as a mouse and a touch panel to designate a region of the common bile duct or the like.

Figure 12:
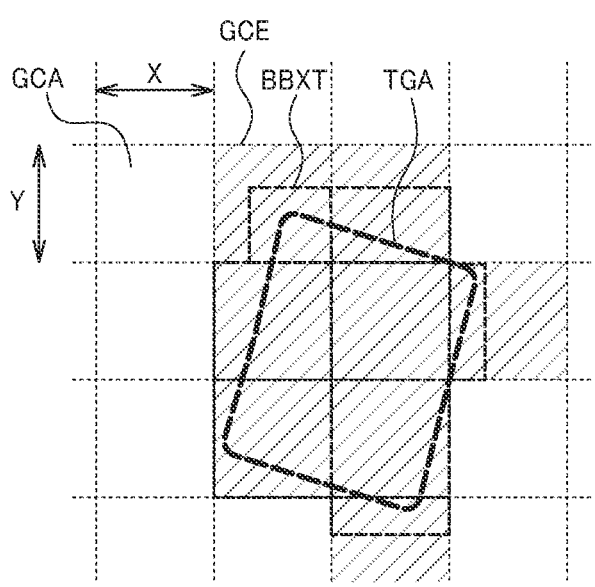
FIG. 12 illustrates an example of annotation data.

As illustrated in FIG. 12, the mask data is converted into a collection of a plurality of bounding boxes, and the collection of the bounding boxes is used as annotation data. A conversion method will be described later as the annotation data generation method. While FIG. 12 illustrates the mask data TGA as an example, mask data TGB to TGD is also converted into respective bounding boxes in a similar method.

As illustrated in FIG. 12, the training image is divided into a group of first grid cells corresponding to a plurality of first grid cells GCA similarly to the detection target image. In FIG. 12, a plurality of grid cells GCE included in the group of the first grid cells overlaps with the mask data TGA. The plurality of grid cells GCE overlapping with such mask data TGA is referred to as a group of third grid cells, and each cell of the group is referred to as a third grid cell. In FIG. 12, the group of the third grid cells is hatched. The group of the third grid cells is included in the group of the first grid cells, and each grid cell itself is identical. That is, the third grid cell GCE also has the horizontal side length X and the vertical side length Y.

A bounding box BBXT is added to each of the third grid cells GCE overlapping with the mask data TGA. One bounding box is added to one mask data TGA in the object detection in the related art. In contrast, in the present embodiment, a plurality of bounding boxes BBXT is generated with respect to one mask data TGA, and the mask data TGA is covered with a collection of the plurality of bounding boxes BBXT.

Figure 13:
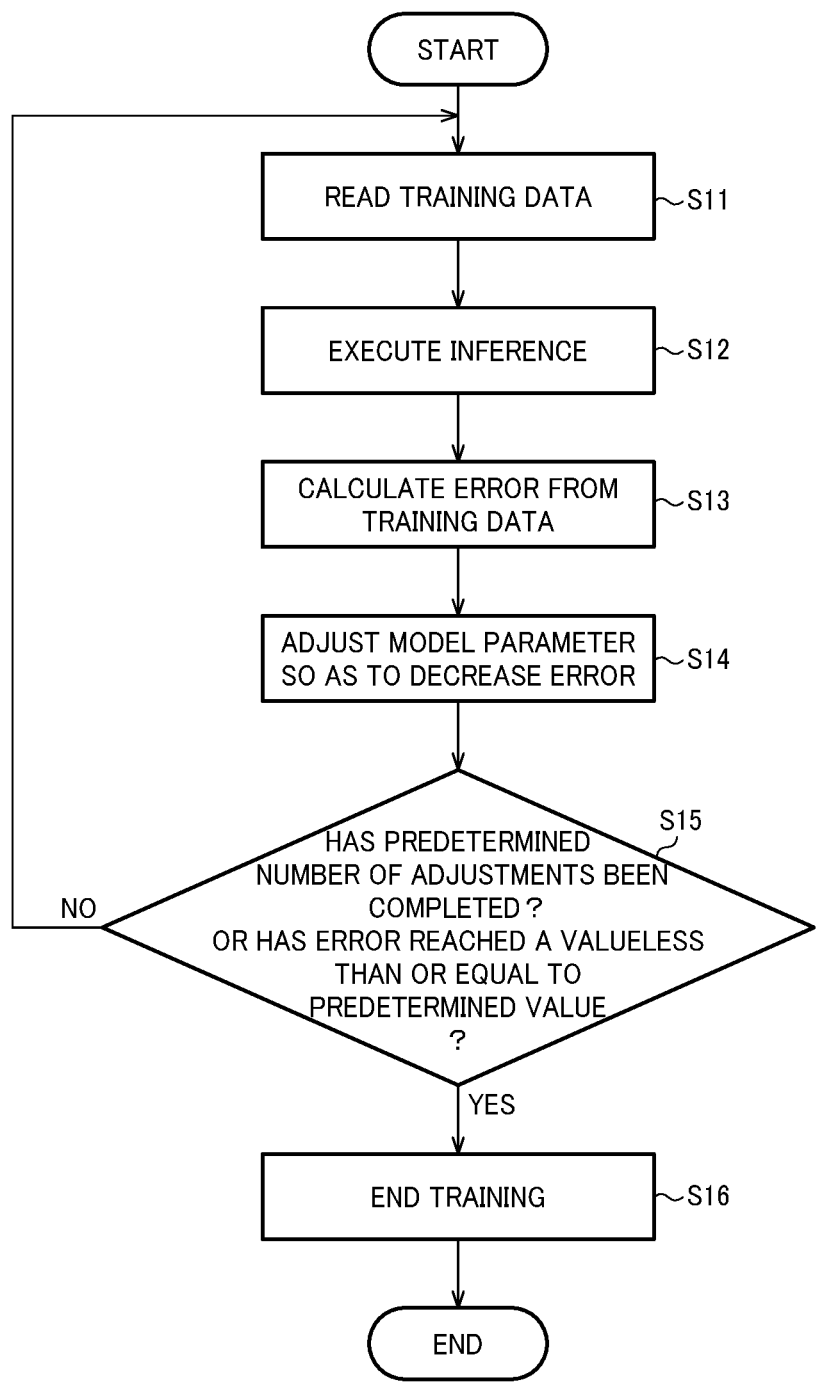
FIG. 13 is a flowchart of training processing.

FIG. 13 is a flowchart of training processing.

The training processing is executed by the training device. The training device includes a processing section, a storage section, an operation section, and a display section. The training device is an information processing device such as a PC. The processing section is a processor such as a CPU. The processing section performs machine learning on a training model to generate a trained model. The storage section is a storage device such as a semiconductor memory and a hard disk drive. The operation section is an operation input device of various types, such as a mouse, a touch panel, and a keyboard. The display section is a display device such as a liquid crystal display. Note that the information processing system 10 illustrated in FIG. 1 may serve also as the training device. In this case, the processing section 4, the storage section 7, the operation section 9, and the display section 3 correspond to the processing section, storage section, operation section, and display section of the training device, respectively.

As illustrated in FIG. 13, in step S11, the processing section of the training device reads out training data from the storage section. For example, one or more training images and annotation data corresponding to the one or more training images are read out in a single inference. The annotation data is the collection of bounding boxes described with reference to FIG. 12. Data indicating a bounding box may be, for example, data indicating positional coordinates and size of the bounding box. Note that mask data and the training image(s) may be stored in the storage section as the training data. In this case, the processing section converts the mask data into a bounding box, and uses the bounding box as the annotation data.

In step S12, the processing section infers the position and shape of the object from the training image(s), and outputs a result of the inference. That is, the processing section inputs the training image(s) into a neural network. The processing section executes inference processing based on the neural network, and outputs the collection of bounding boxes indicating the position and shape of the object.

In step S13, the processing section compares each of the inferred bounding boxes and the bounding box of the annotation data, and calculates an error based on a result of the comparison. That is, the processing section calculates an error between each bounding box output from the neural network and the bounding box as the training data.

In step S14, the processing section adjusts a model parameter of the training model so as to decrease the error. That is, the processing section adjusts a weight coefficient between nodes in the neural network or the like based on the error calculated in step S13.

In step S15, the processing section determines whether or not a predetermined number of parameter adjustments has been completed. In a case where the predetermined number of parameter adjustments has not been completed, the processing section executes steps S11 to S15 again. In a case where the predetermined number of parameter adjustments has been completed, the processing section ends the training processing as described in step S16. Alternatively, the processing section determines whether or not the error calculated in step S13 is less than or equal to a predetermined value. In a case where the error is not less than or equal to the predetermined value, the processing section executes steps S11 to S15 again. In a case where the error is less than or equal to the predetermined value, the processing section ends the training processing as described in step S16.

The trained model is obtained by the above-mentioned training processing, and the trained model is stored in the storage section 7 illustrated in FIG. 1. The training image is divided into the group of the first grid cells, and the object in the training image is positioned so as to overlap with the group of the third grid cells included in the group of the first grid cells. At this time, the trained model is trained by the training data in which the annotation is added to the training image so as to output the position and shape of the object as the collection of the plurality of bounding boxes generated from the group of the third grid cells. As described with reference to FIG. 13, in the annotation, the portion of the object positioned in the third grid cell GCE is surrounded with the bounding box BBXT generated in the respective third grid cell GCE included in the group of the third grid cells, whereby the position and shape of the object is represented by the collection of the plurality of bounding boxes. Specifically, the position and shape of the object is indicated by the mask data, and the portion of the mask data positioned in the respective third grid cell GCE is surrounded with the bounding box BBXT, whereby the position and shape of the mask data are represented by the collection of the plurality of bounding boxes.

In accordance with the present embodiment, the training processing is performed using the annotation in which the position and shape of the object in the training image are represented by the collection of the plurality of bounding boxes, and the object detection using the trained model subjected to the training processing is performed, whereby it becomes possible to perform display in which the position and shape of the object in the detection target image are represented by the collection of the plurality of bounding boxes.

In the cholecystectomy through laparoscopy, the following advantageous effects can be expected. That is, each of the common bile duct, the cystic duct, the Rouviere's sulcus, and the inferior border of the S4 serves as a landmark in the cholecystectomy through laparoscopy, but is a landmark whose position and shape are not clearly displayed in an image. Specifically, the common bile duct and the cystic duct are covered with an organ or tissues, and the Rouviere's sulcus and the inferior border of the S4 are exposed and visually recognizable but have ambiguous boundaries. For example, a doctor or the like who has copious implicit knowledge about the cholecystectomy through laparoscopy adds an annotation to the above-mentioned landmark. With this operation, data indicating the position and shape of the landmark identified by the doctor or the like who has the implicit knowledge is generated as the mask data. Then, machine learning using this mask data as the training data is performed, whereby the landmark that reflects the implicit knowledge and whose position and shape are clarified can be detected and displayed. In the object detection in accordance with the present embodiment, the position and shape of the landmark can be represented not by one rectangle but by the collection of bounding boxes. With this configuration, it is possible to present the position and shape of the unclear landmark to the doctor or the like in a detailed manner while ensuring the real-time characteristic that is important in surgery.

Figure 14:
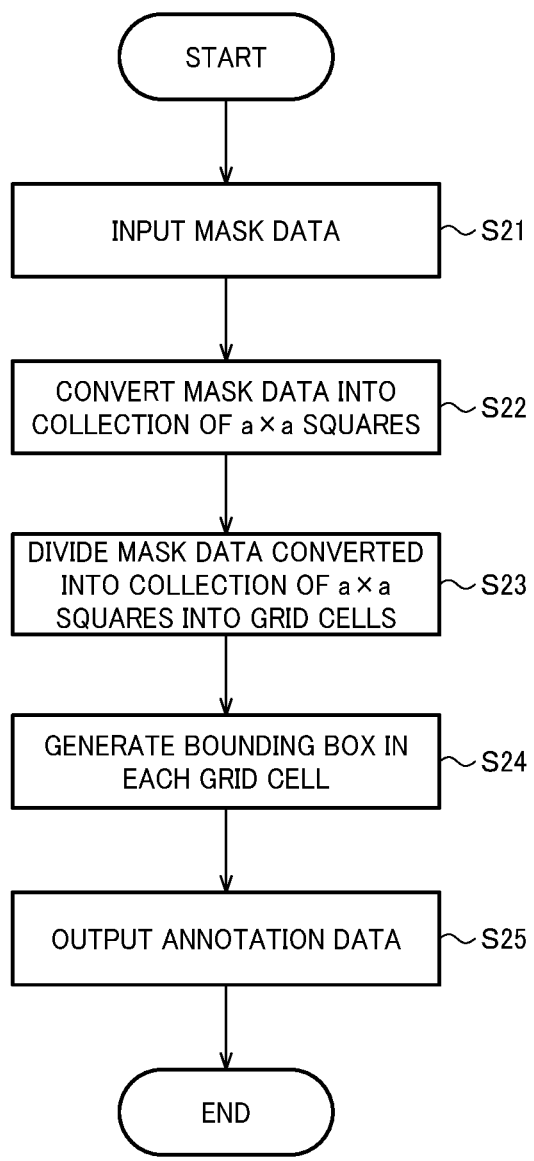
FIG. 14 is a flowchart of an annotation data generation method.
Figure 15:
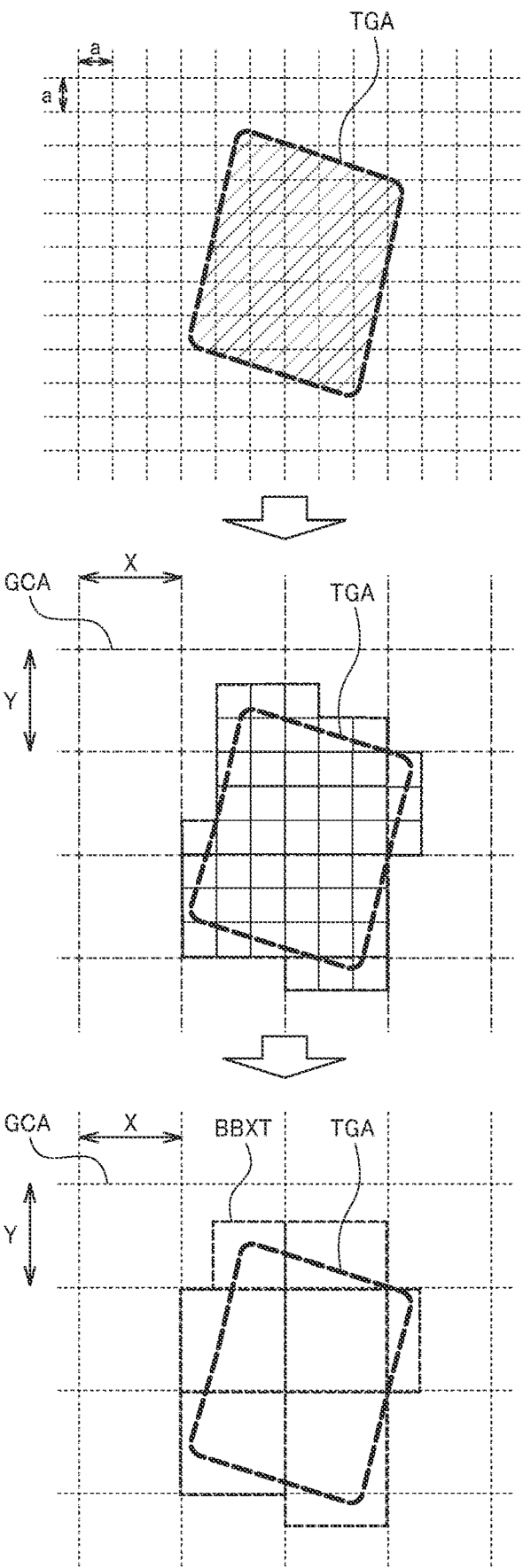
FIG. 15 is a diagram for describing the annotation data generation method.

Subsequently, an annotation data generation method to covert the mask data into the bounding box is described. FIG. 14 is a flowchart of the annotation data generation method. FIG. 15 is a diagram for describing the annotation data generation method. The annotation data generation method, for example, may be executed by an information processing device that is different from the training device, or may be executed by the training device as pre-processing of the training processing.

As illustrated in FIG. 14, the mask data is input in step S21. The mask data is data indicating a region of the object in the training image, and data in which 1 or 0 is added to each pixel. 1 indicates the object and 0 indicates a non-object. The following description is given taking the mask data TGA illustrated in FIG. 11 for example.

In step S22, the mask data TGA is converted into a collection of a×a squares where a is a unit length of each of the candidate box and the bounding box. As illustrated in an upper drawing of FIG. 15, the mask data TGA is divided into a×a grids. In the upper drawing, pixels to which "1" is added among the mask data TGA are hatched. As illustrated in a middle drawing of FIG. 15, a×a squares overlapping with the pixels to which "1" is added among the mask data TGA are extracted. In the middle drawing, the extracted a×a squares are indicated by solid lines.

In step S23, the mask data TGA converted into the collection of a×a squares is divided into the group of the first grid cells. The middle drawing in FIG. 15 illustrates an example in which 3×3 squares, as the a×a squares, correspond to the first grid cells GCA. However, the number of the a×a squares included in one grid cell may be a freely-selected number.

In step S24, the bounding box is generated in each grid cell. As illustrated in the middle and lower drawings of FIG. 15, the bounding box BBXT is generated in the third grid cell GCE so as to include the collection of the a×a squares converted from the mask data TGA. The bounding box BBXT includes the collection of the a×a squares, and thus, as a matter of course, includes a portion of the mask data TGA included in the third grid cells GCE. The bounding box BBXT is generated in each third grid cell GCE included in the group of the third grid cells, whereby the mask data TGA is covered with a plurality of bounding boxes BBXT.

In step S25, the above-mentioned plurality of bounding boxes BBXT is output as annotation data for the object indicated by the mask data TGA.

In the above-mentioned annotation data generation method, the mask data TGA indicating the position and shape of the object in the training image is input, and the mask data TGA is divided into the group of the grid cells. In the annotation data generation method, when the plurality of grid cells GCE included in the group of the grid cells overlaps with the object, the bounding box BBXT is generated in each of the plurality of grid cells GCE. In the annotation data generation method, the collection of the plurality of generated bounding boxes BBXT serves as an annotation for the object.

In accordance with the present embodiment, the annotation data in which one object is surrounded with the plurality of bounding boxes is generated. Machine learning is performed using this annotation data, and the object detection using the trained model that has been trained by the machine learning is performed, whereby it becomes possible to perform display in which the position and shape of the object in the detection target image are represented by the collection of the plurality of bounding boxes.

More specifically, assume that the grid cell GCE included in the group of the grid cells has the horizontal side length X, the vertical side length Y, and a is the unit length that is smaller than each of X and Y. At this time, in the annotation data generation method, the mask data TGA is converted into the collection of the a×a squares. In the annotation data generation method, squares belonging to each of the plurality of grid cells GCE are selected from the collection of the a×a squares, and the bounding box BBXT that includes the selected squares is generated as the bounding box BBXT in each grid cell.

In the machine learning using the annotation data, an inference model infers a bounding box that has the unit length a from the training image. In the annotation data generation method in accordance with the present embodiment, the bounding box having the unit length a is generated. Thus, at the time of error evaluation, the inferred bounding box having the unit length a and the bounding box having the unit length a in the annotation data are compared with each other. The bounding boxes having the identical unit length a are compared with each other, whereby the error evaluation is simplified.

Although the embodiments to which the present disclosure is applied and the modifications thereof have been described in detail above, the present disclosure is not limited to the embodiments and the modifications thereof, and various modifications and variations in components may be made in implementation without departing from the spirit and scope of the present disclosure. The plurality of elements disclosed in the embodiments and the modifications described above may be combined as appropriate to implement the present disclosure in various ways. For example, some of all the elements described in the embodiments and the modifications may be deleted. Furthermore, elements in different embodiments and modifications may be combined as appropriate. Thus, various modifications and applications can be made without departing from the spirit and scope of the present disclosure. Any term cited with a different term having a broader meaning or the same meaning at least once in the specification and the drawings can be replaced by the different term in any place in the specification and the drawings.

The invention claimed is:

1. An information processing system comprising:
a processor configured to perform an object detection to detect an object from a detection target image, the processor being configured to:
divide the detection target image into a group of first grid cells;
when the object is positioned to overlap a group of second grid cells included in the group of the first grid cells, generate a bounding box in a respective second grid cell in the group of the second grid cells; and
surround a portion of the object positioned in the respective second grid cell with the bounding box generated in the respective second grid cell and display, on a display, a position and shape of the object by a collection of a plurality of bounding boxes superimposedly on the detection target image;
wherein when a first one of the second grid cells and a second one of the second grid cells are adjacent to a second grid cell in a horizontal direction, a third one of the second grid cells and a fourth one of the second grid cells are adjacent to the second grid cell in a vertical direction, a length between an anchor of the first one of the second grid cells and an anchor of the second one of the second grid cells is XA, and a length between an anchor of the third one of the second grid cells and an anchor of the fourth one of the second grid cells is YA, and
the processor generates the bounding box having a horizontal side length x smaller than the XA, having a vertical side length y smaller than the YA, and not including the anchors of the first to fourth ones of the second grid cells.

2. The information processing system as defined in claim 1, wherein
the processor determines the bounding box from a plurality of candidate boxes for the bounding box,
when a horizontal side length of the second grid cell is X, and a vertical side length of the second grid cell is Y, the plurality of candidate boxes includes a candidate box that satisfies at least one of the following conditions:
a horizontal side length xc of the candidate box is smaller than the X; and
a vertical side length yc of the candidate box is smaller than the Y.

3. The information processing system as defined in claim 1, further comprising a memory that stores a trained model, wherein
the processor performs the object detection based on the trained model,
the trained model is a trained model that is trained with training data, in which an annotation is added to a training image, when the training image is divided into the group of the first grid cells and the object in the training image is positioned to overlap a group of third grid cells included in the group of the first grid cells, to output the position and shape of the object by the collection of the plurality of bounding boxes generated from the group of the third grid cells, and
the annotation is an annotation in which a portion of the object positioned in a respective third grid cell included in the group of the third grid cells is surrounded with a bounding box generated in the respective third grid cell to represent the position and shape of the object by the collection of the plurality of bounding boxes.

4. The information processing system as defined in claim 1, wherein, when a horizontal side length of the second grid cell is X and a vertical side length of the second grid cell is Y, the x is smaller than or equal to the X and the y is smaller than the YA, or the x is smaller than the XA and the y is smaller than or equal to the Y.

5. The information processing system as defined in claim 4, wherein the x is smaller than or equal to the X and the y is smaller than or equal to the Y.

6. The information processing system as defined in claim 1, wherein each of the x and the y is an integer multiple of a unit length a.

7. The information processing system as defined in claim 1, wherein, a bounding box generated in one of two adjacent second grid cells in the group of the second grid cells, and a bounding box generated in the other of the two adjacent second grid cells do not overlap with each other.

8. The information processing system as defined in claim 1, wherein the processor generates a candidate box for the bounding box using an anchor of the second grid cell as a reference.

9. The information processing system as defined in claim 1, wherein the processor generates a plurality of candidate boxes for the bounding box, calculates a reliability score with respect to each of the plurality of candidate boxes, and determines the bounding box among the plurality of candidate boxes based on the reliability score.

10. The information processing system as defined in claim 9, wherein the processor superimposes the bounding box on the detection target image with opacity depending on the reliability score.

11. The information processing system as defined in claim 9, wherein the processor determines, among a plurality of candidate boxes generated in one of two adjacent second grid cells in the group of the second grid cells and a plurality of candidate boxes generated in the other of the two adjacent second grid cells, a pair of candidate boxes that do not overlap with each other as the bounding box in the one of the two adjacent second grid cells and the bounding box in the other of the two adjacent second grid cells.

12. The information processing system as defined in claim 9, wherein,
when a first one of the second grid cells and a second one of the second grid cells are adjacent to the second grid cell in a horizontal direction, a third one of the second grid cells and a fourth one of the second grid cells are adjacent to the second grid cell in a vertical direction, a length between an anchor of the first one of the second grid cells and an anchor of the second one of the second grid cells is XA, and a length between an anchor of the third one of the second grid cells and an anchor of the fourth one of the second grid cells is YA, the processor generates the plurality of candidate boxes each having a horizontal side length xc that is smaller than the XA, having a vertical side length yc that is smaller than the YA, and not including the anchors of the first to fourth ones of the second grid cells.

13. The information processing system as defined in claim 12, wherein, when a horizontal side length of the second grid cell is X and a vertical side length of the second grid cell is Y, the xc is smaller than or equal to the X and the yc is smaller than the YA, or the xc is smaller than the XA and the yc is smaller than or equal to the Y.

14. The information processing system as defined in claim 13, wherein the xc is smaller than or equal to the X and the yc is smaller than or equal to the Y.

15. The information processing system as defined in claim 12, wherein each of the xc and the yc is an integer multiple of a unit length a.

16. An endoscope system comprising:
the information processing system as defined in claim 1; and
an image sensor that captures the detection target image.

17. An information processing method for an object detection to detect an object from a detection target image, the method comprising:
dividing the detection target image into a group of first grid cells;
generating, when the object is positioned to overlap a group of second grid cells included in the group of the first grid cells, a bounding box in a respective second grid cell in the group of the second grid cells; and
surrounding a portion of the object positioned in the respective second grid cell with the bounding box generated in the respective second grid cell and displaying, on a display, a position and shape of the object by a collection of a plurality of bounding boxes superimposedly on the detection target image;
wherein when a first one of the second grid cells and a second one of the second grid cells are adjacent to a second grid cell in a horizontal direction, a third one of the second grid cells and a fourth one of the second grid cells are adjacent to the second grid cell in a vertical direction, a length between an anchor of the first one of the second grid cells and an anchor of the second one of the second grid cells is XA, and a length between an anchor of the third one of the second grid cells and an anchor of the fourth one of the second grid cells is YA, and the generating of the bounding box comprises generating the bounding box having a horizontal side length x smaller than the XA, having a vertical side length y smaller than the YA, and not including the anchors of the first to fourth ones of the second grid cells.

18. An annotation data generation method, the method comprising:
inputting mask data indicating a position and shape of an object in a training image;
dividing the mask data into a group of grid cells;
generating, when a plurality of grid cells included in the group of grid cells overlaps with the object, a bounding box in each of the plurality of grid cells; and
using a collection of a plurality of the generated bounding boxes as an annotation for the object;
wherein, when a horizontal side length of a grid cell included in the group of the grid cells is X, a vertical side length of the grid cell is Y, and a represents a unit length that is smaller than each of the X and the Y,
the method further comprises:
converting the mask data into a collection of axa squares;
selecting squares belonging to each of the plurality of grid cells from the collection of the axa squares; and
generating a bounding box that includes the selected squares as the bounding box in each grid cell.

19. The information processing method as defined in claim 17, wherein, when a horizontal side length of the second grid cell is X and a vertical side length of the second grid cell is Y, the x is smaller than or equal to the X and the y is smaller than the YA, or the x is smaller than the XA and the y is smaller than or equal to the Y.

20. The information processing method as defined in claim 19, wherein the x is smaller than or equal to the X and the y is smaller than or equal to the Y.

* * * * *